United States Patent [19]

DuVall et al.

[11] 4,422,100
[45] Dec. 20, 1983

[54] DOCUMENT SCANNING APPARATUS

[75] Inventors: Dale R. DuVall, Keller; Barry C. Kockler, Lewisburg, both of Tex.

[73] Assignee: The Mead Corporation, Dayton, Ohio

[21] Appl. No.: 355,411

[22] Filed: Mar. 8, 1982

[51] Int. Cl.³ .............................................. H04N 1/24
[52] U.S. Cl. ....................................... 358/293; 355/8; 355/67; 358/294; 362/217; 362/347
[58] Field of Search .................... 358/293, 294; 355/8, 355/67; 362/217, 347

[56] References Cited

U.S. PATENT DOCUMENTS

| 3,302,519 | 2/1967 | Young. | |
|---|---|---|---|
| 3,947,115 | 3/1976 | Hamaguchi | 355/8 |
| 4,095,881 | 6/1978 | Maddox | 355/30 |
| 4,239,383 | 12/1980 | Peterson | 355/67 |
| 4,259,711 | 3/1981 | Mochizuki | 355/67 |
| 4,273,441 | 6/1981 | Nagoshi | 362/347 |

OTHER PUBLICATIONS

IBM Technical Disclosure Bulletin, vol. 14, No. 11, pp. 3236-3237, by Baxter et al., dated Apr. 1972.

Primary Examiner—Howard Britton
Attorney, Agent, or Firm—Biebel, French & Nauman

[57] ABSTRACT

An illuminator for a traveling scanner of a document scanning system is disclosed. The illuminator comprises an elliptic-cylindrical surface of about one-half an ellipse in section with a line light source lamp located on one elliptic focal line. The illuminator is positioned so that the line of a document being copied is located at the other elliptic focal line. A reflecting cylindrical light baffle is positioned over the lamp to reflect light that would otherwise not strike the elliptical reflecting surface back through the source and onto the elliptical reflecting surface. The open end of the ellipse is covered with a heat filter to protect the material being copied. The ellipse is set at a relatively small angle, and a perpendicular reflection of material from the document being copied passes through a slot in the heat filter and a slot in the base of the ellipse for further sensing.

8 Claims, 13 Drawing Figures

DOCUMENT SCANNING APPARATUS

BACKGROUND OF THE INVENTION

This invention relates to an illuminator for a document scanning system of a copying machine. More particularly, the invention relates to apparatus to concentrate a line of intense light on a document for optical readout of the light reflected from the document.

Typical prior art illuminators are exemplified by the following patents and publications. Peterson U.S. Pat. No. 4,239,383 discloses primary and secondary elliptical reflectors to concentrate a line of light from a lamp in a narrow band. A third flat reflector reflects a portion of the light from the light source which would not otherwise be directed into the narrow band back into the primary and secondary reflectors to be reflected into the narrow band of light. Maddox U.S. Pat. No. 4,095,881 discloses an illuminator having a lamp at one focal point of an elliptical cylinder and an interference filter for separating the IR radiation and redirecting the IR rays back to the incandescent lamp for further heating the lamp. Hamaguchi U.S. Pat. No. 3,947,115 discloses two right elliptical cylinders of different ellipticity with a common line foci. A line light source is positioned at the other foci of the first, and the other foci of the second is positioned on the material being copied. Young U.S. Pat. No. 3,302,519 discloses an illuminator comprising sections of two different size cylindrical ellipses having common focal points with the line light source at one and the copy line at the other. The reflection for the copy passes in the offset between the ellipses. IBM Technical Disclosure Bulletin Vol. 14, No. 11, April 1972, at page 3236, Baxter et al in "Document Illuminator Using Elliptic and Dichroic Reflectors" discloses an illuminating system in which two line light sources positioned respectively at focal points in two separate ellipses cooperate with two circular cylindrical mirrors and elliptical sections to provide a line of high luminous intensity with an open path between the elliptical sections for the reflected light. Interference filters are used to reflect infrared radiation away from the document being copied.

SUMMARY OF THE INVENTION

The invention provides a relatively simple, rugged, highly efficient, easily fabricated, and economical illuminator for a scanning system of a copying machine. It is suitable for high speed transport between scanning stations and across an exposure area of a platen for bulky document copying. The illuminator comprises a cylindrical elliptical focal system with a line source of light at one focus of elliptical focal points and the line being copied at the other locus of focal points. A section of a circular cylindrical mirror returns direct illumination from the lamp through the lamp to the elliptical reflecting surface, providing substantially complete concentration of all the illumination from the lamp on the area being copied, thus greatly increasing the illuminating efficiency. Reflected light from the document passes to the side of the light source and circular section reflector and through a narrow opening or slit in the base of the elliptical reflector to optical sensors. The elliptic-cylindrical reflectors comprises approximately one-half an ellipse. The open end of the ellipse has a heat filter to protect the document from receiving damaging heat from the lamp.

DETAILED DESCRIPTION

Figure 1:
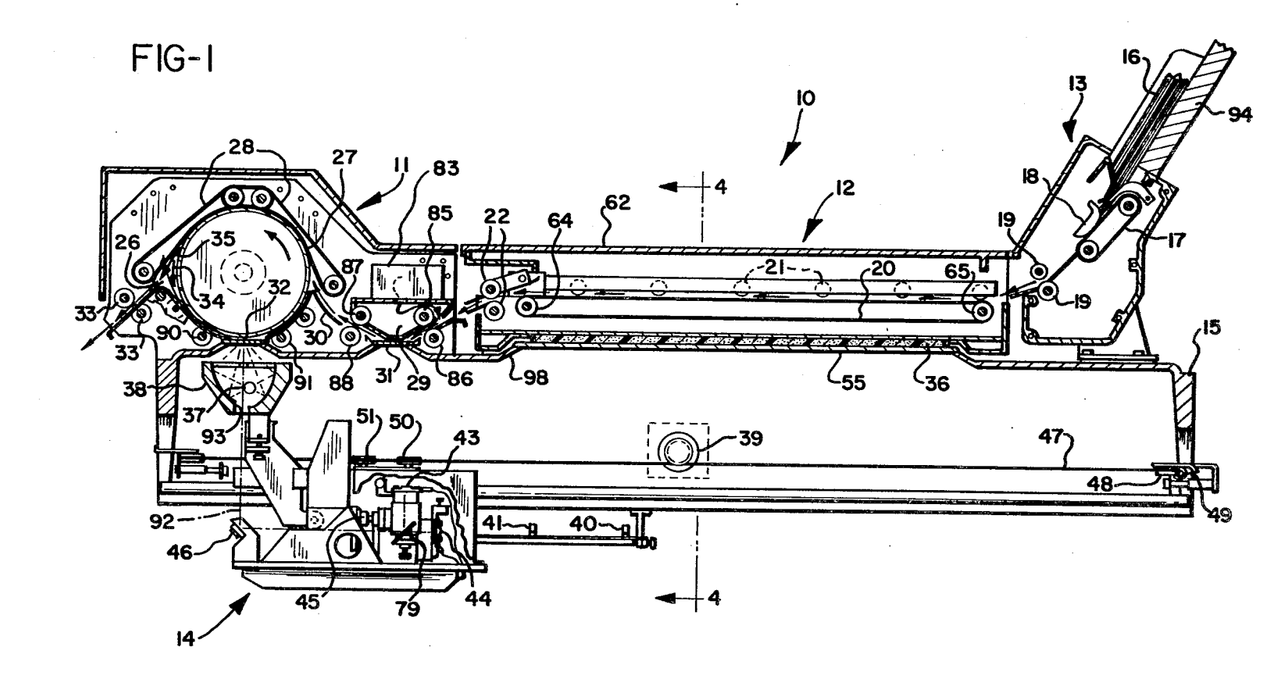
FIG. 1 is a partially sectioned side elevation view of a document scanning system illustrating an embodiment of the present invention.

A document scanning system having an illuminator in accordance with the present invention may be constructed as generally illustrated in FIG. 1. As illustrated in FIG. 1, a document scanning system 10 may comprise a scan station assembly 11, a platen cover 12, a document feeder assembly 13, and a scanner carriage assembly 14 all supported by a frame 15. Document exposure occurs either at a platen 55 or at a first exposure station defined by scan glass 31. In either case, scanning is performed by optical elements mounted upon scanner carriage 14.

Scan glass 31 is utilized for front side scanning of automatically fed sheet-type original documents, while platen 55 is used for exposure of either sheet-type or bulky original documents. Platen cover 12 is hinged, as hereinafter described, to accommodate exposure of bulky documents.

Document scanning system 10 also comprises a second exposure station defined by scan glass 32. The second exposure station is provided in order to accommodate reverse side scanning of automatically fed sheet-type documents, thereby providing scanning information for duplex copying. Automatic feeding of sheet-type documents is carried out as hereinafter described such that the documents pass through the second exposure station in a direction which is opposite to the direction of passage through the first exposure station.

It is a feature of the scanning system that scan glass 31, scan glass 32 and platen 55 are all positioned in a common plane for scanning by scanning element carried by scanner carriage 14. The scanner elements, as hereinafter described, are adjusted for optical focusing at the common plane, and scanner carriage 14 is supported for linear motion along a path parallel to the plane so defined.

Document scanning system 10 is equipped with operator controls (not illustrated) which enable selection of either a manually initiated scanning mode (platen scanning) or an automatic document handling mode. Other controls are provided for selecting either one or two side scanning, indicating document size and entering various control commands as appropriate for operating the scanning system and controlling the associated printer. A data processing system (not illustrated) provides control commands for the document scanning system of this invention and receives the scanning information which is produced. The scanning information is processed and stored for use in generating printing control signals.

It will therefore be seen that a document scanning system in accordance with this invention has the following four different operating modes:

Mode I—Manually initiated scanning of bulky documents (platen cover 12 raised).

Mode II—Manually initiated scanning of sheet-type original documents (platen cover 12 closed).

Mode III—Automatic feeding and single side scanning of sheet-type original documents.

Mode IV—Automatic feeding and two-side scanning of sheet-type original documents.

As illustrated in FIG. 1, document scanning system 10 is operating in above-mentioned Mode IV. Moreover, the system is illustrated during that portion of a scanning cycle when the reverse side of a sheet is being scanning. At that particular time, scanner carriage 14 is positioned such that the scanning optics ae directly below scan glass 32. During Mode IV, scanner carriage 14 is driven back and forth between the position illustrated in FIG. 1 and the position illustrated in FIG. 2 (scanning optics below scan glass 31). For operation in Mode III, scanner carriage 14 remains fixed at the position illustrated in FIG. 2.

Figure 3:
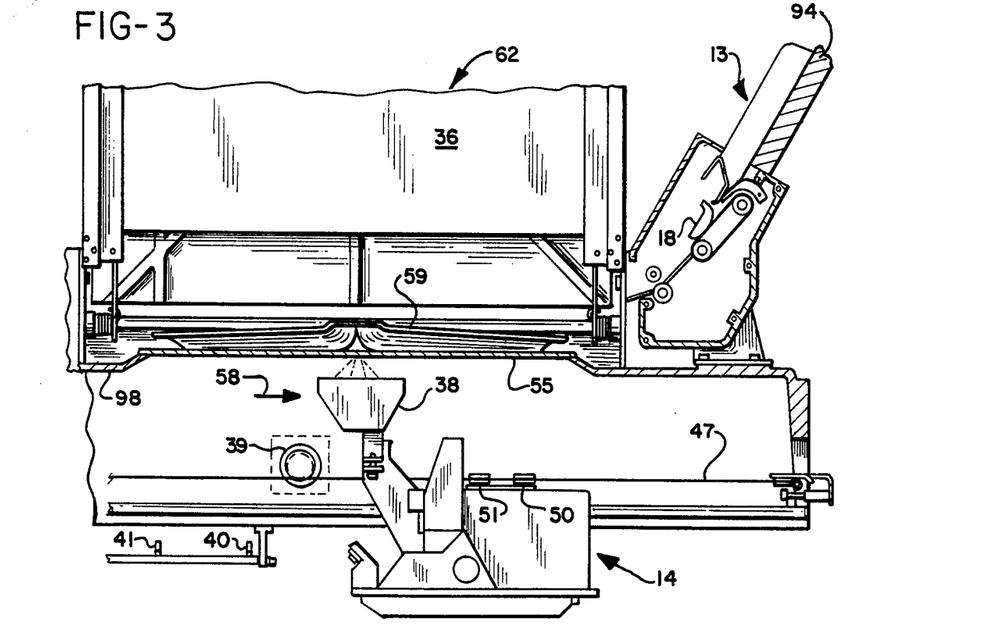
FIG. 3 illustrates the position of a scanner carriage assembly for scanning bulky original documents.

FIG. 3 illustrates the movement of scanner carriage 14 during operation in Modes I and II. The operating controls for both of these modes are identical. However, as illustrated in FIG. 3, the system may be said to be operating in Mode I, because a bulky document 59 is positioned on platen 55, and platen cover 12 is raised.

Figure 2:
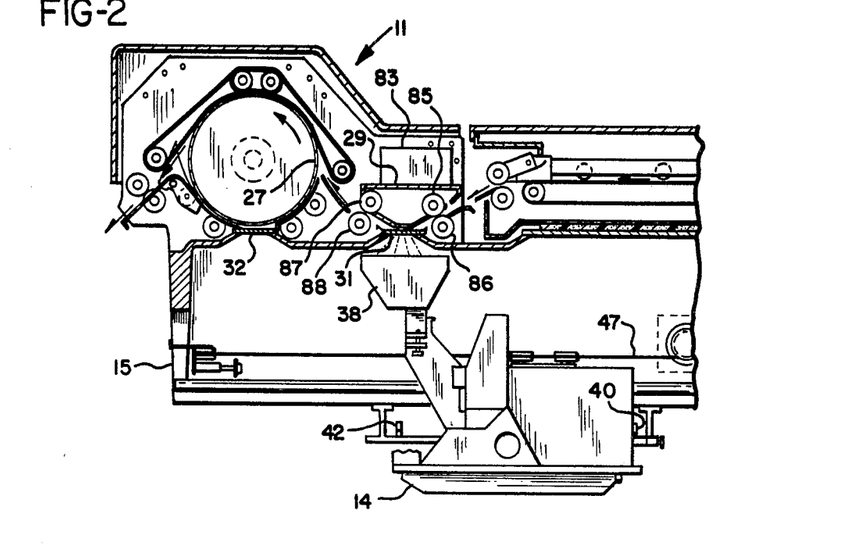
FIG. 2 illustrates the position of a scanner carriage assembly for scanning the front side of sheet-type original documents.

Documents scanning system 10 is provided with three optical sensors 40, 41 and 42 as best illustrated in FIGS. 2 and 3. These sensors detect beams of light which are positioned for interruption by a flag 71 (see FIG. 4) which is carried by scanner carriage 14. Sensor 42 provides an indicating signal for the control system when scanner carriage 14 is positioned at the location illustrated in FIG. 1. Sensor 41 provides a corresponding indication when scanner carriage 14 is in the position illustrated in FIG. 2. Sensor 40 provides an indication when scanner carriage 14 is in a position known as the "home" position.

Figure 10:
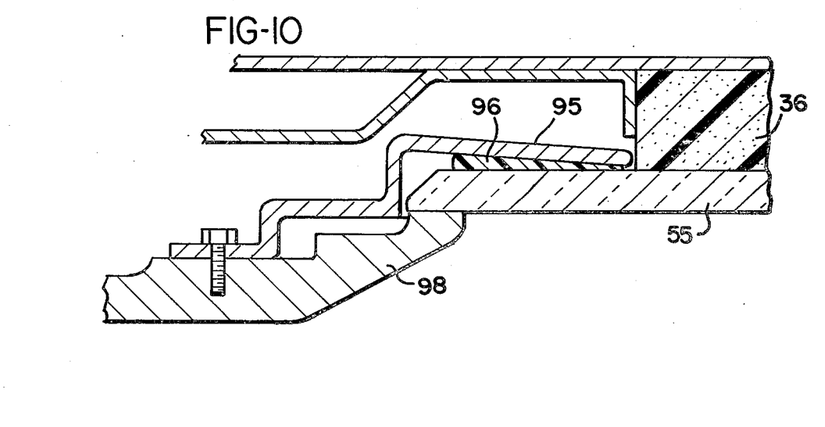
FIG. 10 is an enlarged view of a portion of FIG. 1 illustrating a typical calibration strip.

Document scanning system 10 also has a calibration strip 96 mounted against platen 55 by means of a clamp 95, as illustrated in FIG. 10. Clamp 95 may be fastened to glass support member 98 by any suitable fastening means. Calibration strip 96 may be cut from a sheet of ethylene propylene or other uniformly white material. Prior to commencement of scanning in any of Modes I through IV, scanner carriage 14 is in the "home" position. As a first step in any scanning sequence, scanner carriage 14 is driven to a calibration position where the scanner is viewing calibration strip 96. At that time, the scanner is calibrated to produce output signals accurately representing the known reflectivity of calibration strip 96.

After calibration has been completed, scanner carriage 14 moves toward platen 55 (Modes I or II) or toward scan glass 31 (Modes III or IV). In the case of scanning in either of Modes I or II, the document to be scanned is held stationary on platen 55 while the scanner carriage moves at a uniform speed in the direction of arrow 58 (FIG. 3).

For operation of document scanning system 10 in either of Modes III or IV, a set of sheet-type original documents are placed face down in a stack 16 upon a receiving tray 94 of feeder 13, as illustrated in FIG. 1. A feed belt 17 feeds individual documents past a retard member 18. Conventional retard member 18 effectively prevent multiple feeds, so that individual documents are fed through the nip between rollers 19.

Figure 5:
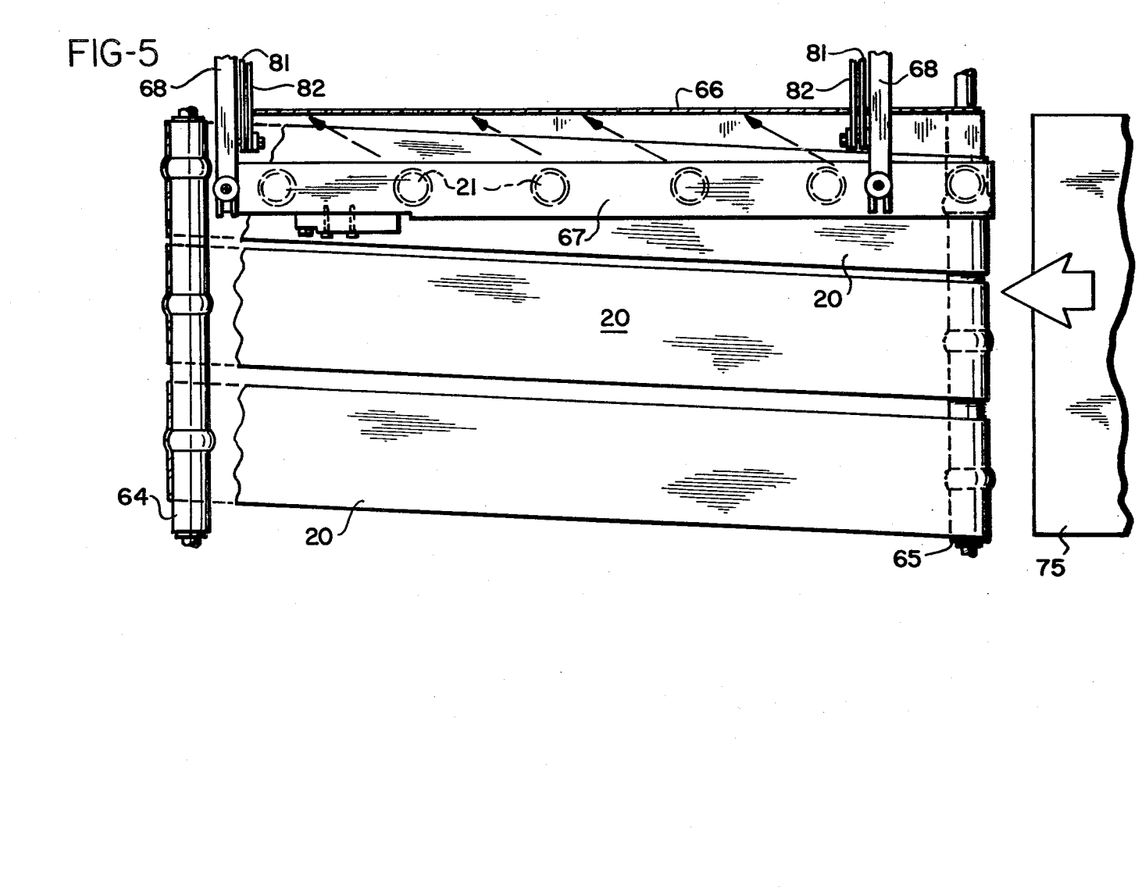
FIG. 5 illustrates transport belts for guiding sheet-type original documents through a platen cover.

After passage between rollers 19, the sheet-type documents are received by a series of belts 20 which are mounted inside platen cover 12, as illustrated in FIG. 5. Belts 20 are angularly mounted on rollers 64 and 65 for receiving a document 75 and transporting it forwardly toward rollers 22 and sidewardly toward registration guide 66. This provides accurate side registration of the documents prior to scanning at scan glass 31.

Platen cover 12 also comprises a series of hold-down balls 21 mounted in a ball cage 67. Hold-down balls 21 urge document 75 downwardly against tranport belts 20 without inhibiting sideward movement toward registration guide 66.

Ball cage 67 is carried by a pair of arms 68, each of which is pivotally supported by a support post 69. There is a lid 62 which covers platen cover 12 and which can be raised upwardly about a hinge line 74 after releasing a latch 63. Ball cage lift arm 68 is connected to lid 62 by links 81 and 82. This provides access to the inside of platen cover 12 for clearance of any paper jam which might occur.

For copying of bulky documents, platen cover 12 may be raised as illustrated in FIG. 3. Lifting of plated cover 12 is facilitated by a weight counterbalancing gas spring 60. Additional counterbalancing is provided by a torsion spring 61 which is mounted about hinge line 74 and connected to lid 62.

For operation in scanning Mode II, it is desirable that a clean, reflective background be provided. Thus, platen cover 12 includes a pressure pad 36 which conveniently may comprise a white polyurethane elastomer sheet bonded to a resilient polyurethane foam material. The white elastomeric sheet provides the desired reflective background, so that small size sheet-type original documents may be copied without production of a cluttered or unsightly background. It will be noted that transport belts 20 are positioned for guiding sheet-type original documents between lid 62 and pressure pad 36 when platen cover 12 is lowered and document scanning system 10 is engaged in automatic document handling in either of scanning Modes III or IV.

Scan station assembly 11 receives sheet-type documents such as documents 75 from rollers 22 of platen cover 12. Documents 75 received by rollers 85 and 86 are delivered into a narrow gap between the lower surface of a plenum chamber 29 and the upper surface of scan glass 31. Passage of the documents through this gap is assisted by flowing air generated by a fan mounted within fan box 83.

After passage through the first exposing station, as above described, documents 75 are delivered to drum 27 for transportation either to the second exposing station defined by scan glass 32 or to a pair of exit rollers 33, depending upon whether two-side or one-side scanning is desired. Documents 75 are guided toward drum 27 by guide member 30 and are gripped against the drum by a set of cooperating guide belts 28. Drum 27 is preferably covered by a white elastomeric sleeve.

Scan station assembly 11 includes a movable gate 26 which may be positioned against drum 27 or opened to the position illustrated in FIG. 1. When gate 26 is in the opened position, documents 75 follow the path indicated by arrow 34. This causes the documents to follow drum 27 around to scan glass 32 for exposure. It will be noted that documents 75 approach scan glass 32 in an inverted position. That is, the side of each document which is presented to scan glass 32 is opposite the side previously presented to scan glass 31. Furthermore, the document moves in opposite directions during the two exposures, so there is no top-to-bottom reversal of the scanning data. There is, however, a left-to-right image reversal, which is readily accommodated by the data handling system.

After passage past scan glass 32, documents 75 are carried upwardly toward roller 91 and other rollers and guide members until they reach belts 28 for a second time. Thereafter, the system controller closes gate 26 against drum 27. Gate 26 then strips the document 75 away from drum 27 for movement in the direction indicated by arrow 35. This directs the document toward exit rollers 33.

Preferred scanning optics for use in the practice of this invention comprise an illuminator 38 including an illumination lamp 37, as illustrated in FIG. 1. The inside surface of illuminator 38 defines a section of an elliptical cylinder, and illumination lamp 37 is positioned along the enclosed focal line of the elliptical cylinder. Scanner carriage 14 tranports illuminator 38 along a path with respect to the common plane of scan glass 31, scan glass 32, and platen 55 such that the non-enclosed focal line of the elliptical cylinder coincides with the common plane. This causes a bright line of illumination to be focussed upon the surface of the document being scanned at any point along the common plane. An image of that portion of a document which is so illuminated is reflected backwardly along an optical path 92 which extends through an elongated slot 93 in the rear of illuminator 38. Elongated slot 93 extends parallel to the focal lines and is substantially the same length as illumination lamp 37. Further, slot 93 is positioned such that a plane extending along an optical path from the non-enclosed focal line to the slot makes an acute angle of approximately 10° with another plane extending along the major axis of the elliptic cylinder between the focal lines.

Figures 6, 6A:
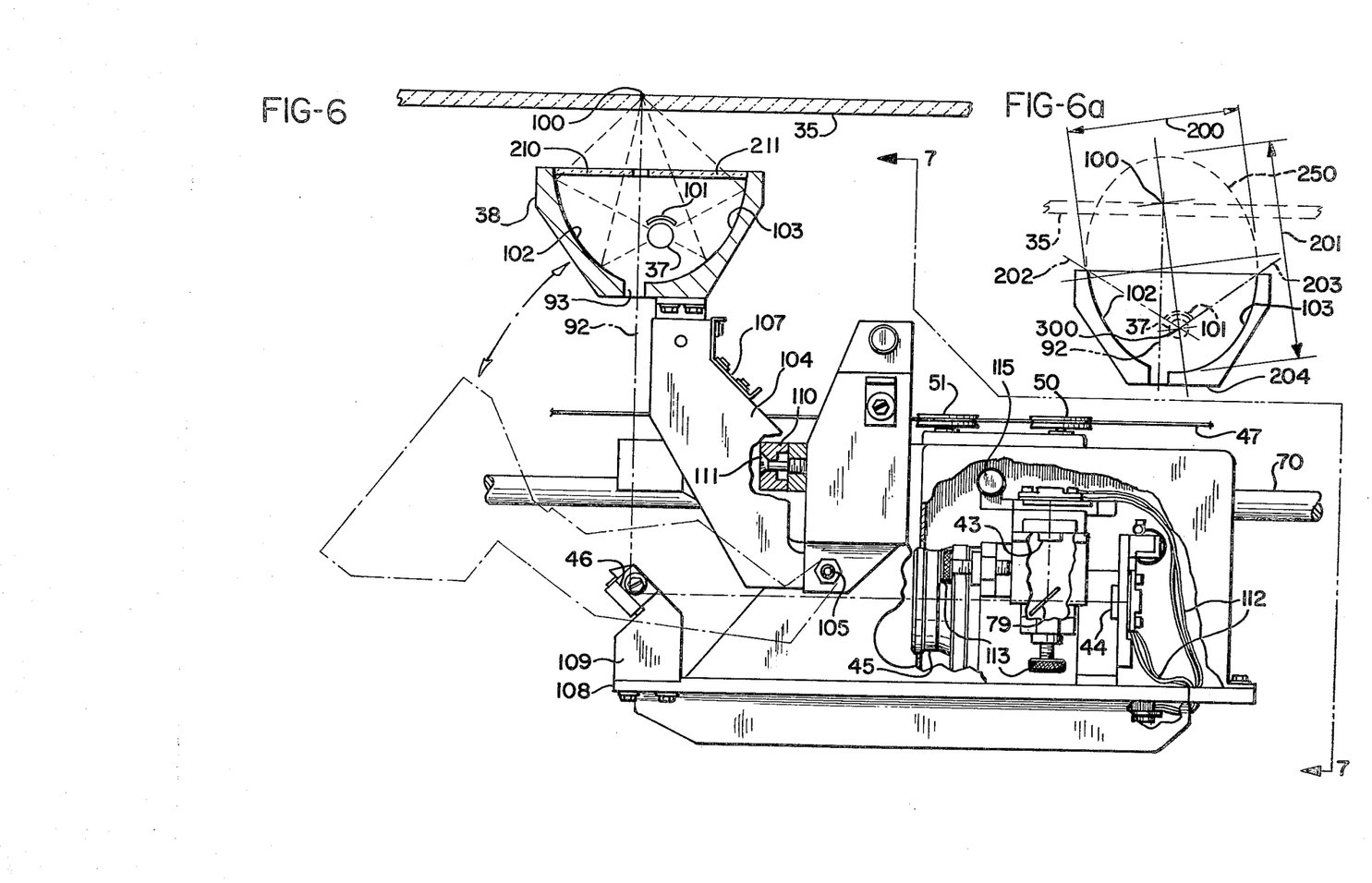
FIG. 6 is a partially sectioned side elevation view illustrating a typical scanning carriage and document illuminator according to the present invention.
FIG. 6a is a schematic illustration of the geometry of a typical illuminator.
Figure 11:
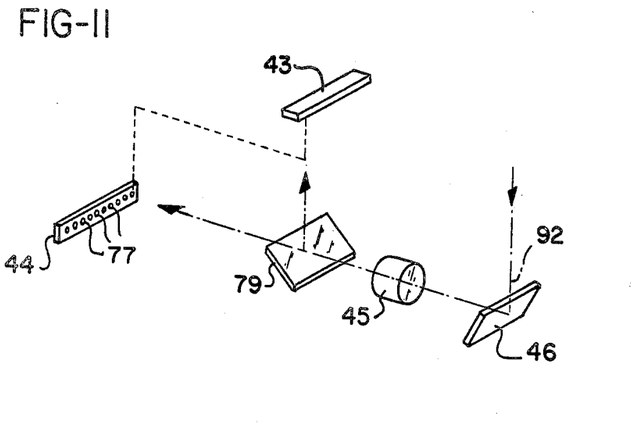
FIG. 11 schematically illustrates a typical optical path from an illuminator to intensity sensors.

After passage through opening 93, optical path 92 proceeds toward a pair of CCD arrays 43 and 44, as best illustrated in FIGS. 6 and 11. The path toward the CCD arrays 43 and 44 carries the reflected light downwardly for reflection off the surface of a folding mirror 46 and then through a lens 45. The light then proceeds toward a beam splitter 79, which directs half of the light along a path toward CCD array 43 and half of the light along another path toward CCD array 44. CCD arrays 43 and 44 each comprise a series of charge coupled photodetectors 77 of conventional design. For example, arrays 43 nd 44 may be Fairchild CCD 143 arrays. These arrays, while readily available on the commercial market, are not sufficiently long for scanning the entire width of one of documents 75. This length deficiency may be accommodated by utilizing a pair of such arrays, as illustrated in FIG. 11. The two arrays are optically butted together, so that the last photodetector 77 of CCD array 43 is optically positioned adjacent the first photodetector 77 of CCD array 44. If desired, CCD arrays 43 and 44 may be positioned with a few overlapping photodetectors 77, and redundant scanning information may be discarded. The electrical signals produced by CCD arrays 43 and 44 are used ultimately to control the printer of the copying machine.

Of course, it should be recognized that the disclosed illuminator may be used with photodetecting elements for receiving the image light other than CCD arrays. Thus the illuminator is suitable for use in a wide variety of electrophotographic copying systems.

Figure 9:
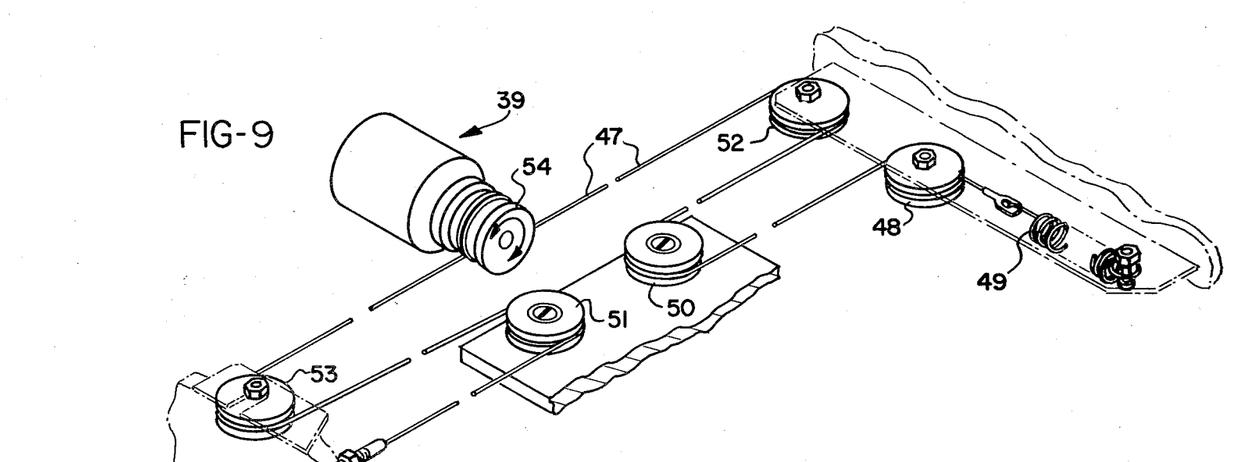
FIG. 9 is a schematic illustration of a typical driving mechanism for a scanner and illuminator.

The driving mechanism for scanner carriage 14 is illustrated in FIG. 9 and comprises a drive motor 39, a drive pulley 54, a drive cable 47, idler pulleys 50 through 53, a snubber 48 and a tension spring 49. Idler pulleys 52 and 53 are supported by frame 15, while idler pulleys 50 and 51 are supported by scanner carriage 14. Drive pulley 54 includes a helical groove for receiving and driving drive cable 47. One end of drive cable 47 is secured to frame 15, while the other end of cable 47 is secured to spring 49. Spring 49 is secured to frame 15 so as to maintain tension in cable 47 and to accommodate variations in the length thereof. Snubber 48 is non-rotatable and serves to maintain tension in cable 47 during acceleration and deceleration of scanner carriage 14. The drive arrangement produces linear movement of scanner carriage 14 at a velocity equal to one-half the linear movement velocity of cable 47 around drive pulley 54.

Figure 4:
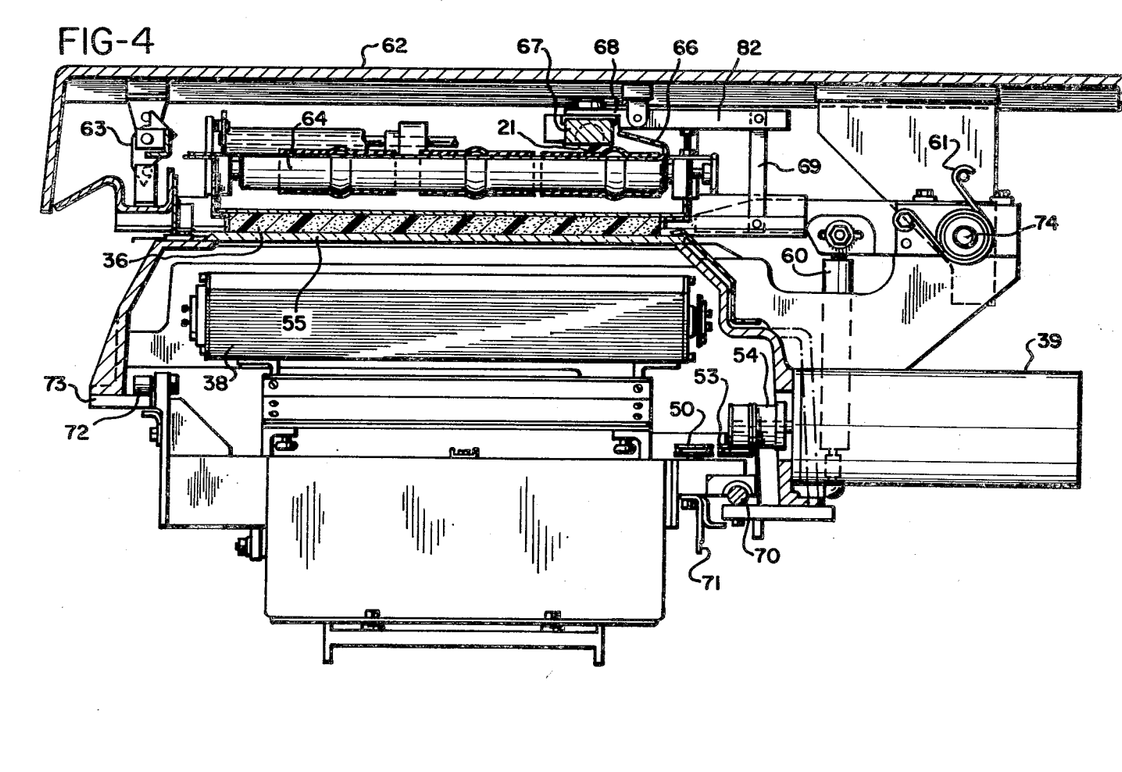
FIG. 4 is a view taken along the lines 4—4 of FIG. 1.

During its linear driving movement as above described, scanner carriage 14 is supported by a guide rail 70 and a ledge 73 (FIG. 4). Scanner carriage 14 maintains a sliding contact with guide rail 70. A support roller 72 is provided for rolling contact with ledge 73.

Figure 7:
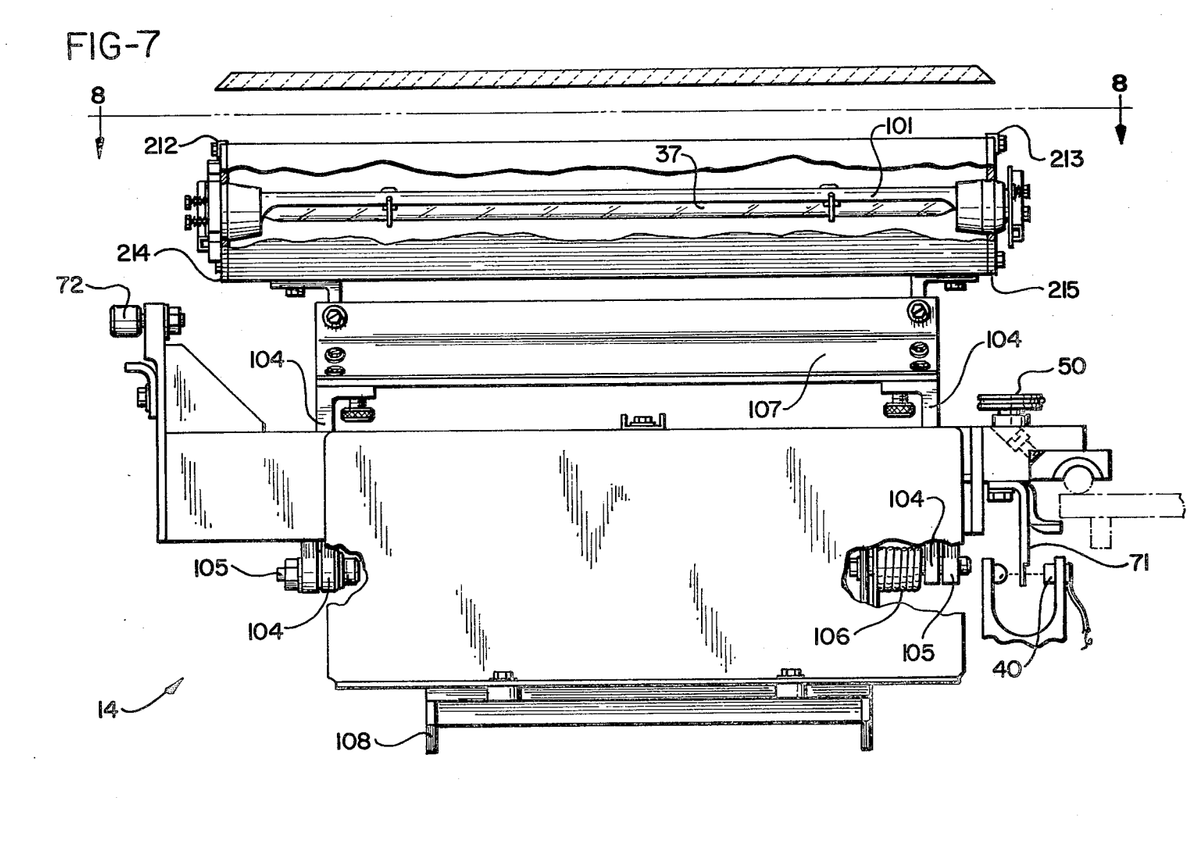
FIG. 7 is an end elevation view of a carriage and illuminator as shown in FIG. 6.
Figure 8:
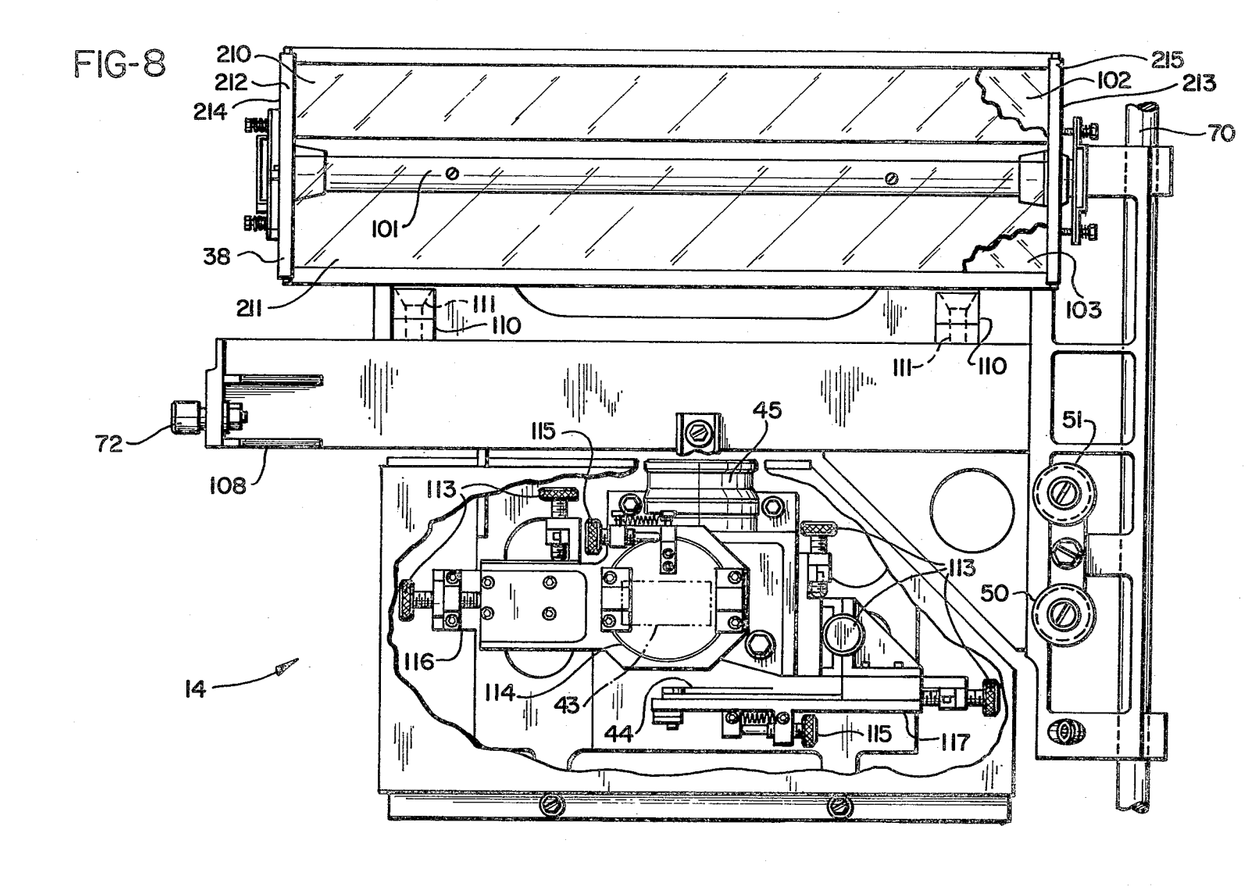
FIG. 8 is a top view of the carriage and illuminator illustrated in FIGS. 6 and 7.

The details of scanner carriage assembly 14 are illustrated in FIGS. 6, 7 and 8. As illustrated in those figures, illuminator 38, CCD arrays 43 and 44 and the associated optics are carried by a carriage frame assembly 108. Illuminator 38 comprises a pair of reflectors 102 and 103, which define portions of an elliptical cylinder with illumination lamp 37 arranged along one focal line thereof. Scanner carriage 14 moves illuminator 38 along a path such that the other focal line of the above mentioned ellipse is maintained at the face of the document being scanned, as indicated by the reference numeral 100.

Illuminator 38 is supported by a pair of support arms 104, which are pivotally attached to frame assembly 108 by means of a pair of pivot pins 105. This permits illuminator 38 to be swung downwardly as indicated by phantom lines on FIG. 6 for access to lamp 37. Arms 104 carry blocks 110, which bear against corresponding blocks on frame assembly 108 when illuminator 38 in swung upwardly into the operating position. A pair of screws 11 are provided for locking illuminator 38 in the upward operating position. Upward biasing is provided by a spring 106, as illustrated in FIG. 7. A stiffening member 107 extends between arms 104 to prevent stresses on illuminator 38.

Folding mirror 46 is mounted on frame assembly 108 by means of a mount 109. Mount 109 maintains folding mirror 46 at the proper position for folding optical path 92 through approximately 90° from substantially a vertical path to substantially a horizontal path toward lens 45. A suitable lens bracket is provided for securing lens 45 to frame assembly 108. Lens 45 receives rays of image light and focuses these rays into an image of the document on the photodetecting elements of the CCD array producing an electrical representation of the image.

CCD array 43 and CCD array 44 are carried by a pair of slide assemblies 116 and 117, respectively. Slide assembliies 116 and 117 are slidably carried by frame assembly 108. Each of slide assemblies 116 and 117 is provided with three adjustment screws 113 for linear adjustment in three coordinate directions. CCD arrays 43 and 44 are mounted on slide assemblies 116 and 117 by means of circular plastic mounts 114. Adjustment screws 115 are provided for adjusting the angular orientation of CCD arrays 43 and 44 relative to their respective slide assemblies 116 and 117. Carriage frame assembly 108 has a suitable receptacle for receiving flexible cables 112, which extend from CCD arrays 43 and 44. Flexible cables 112 carry the scanning signals which are generated by CCD arrays 43 and 44.

Figure 12:
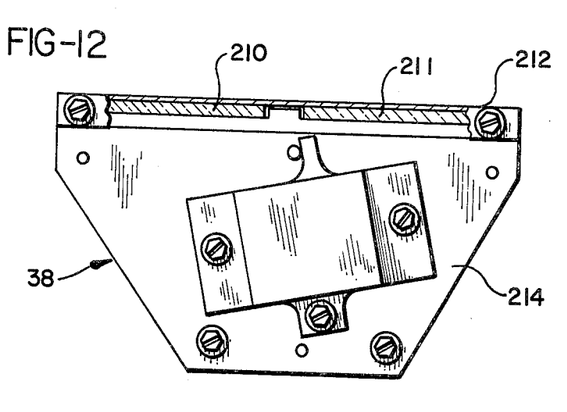
FIG. 12 illustrates an end view of an illuminator broken away to show in partial section typical heat filters.

In addition to the details of a typical illuminator, as illustrated in FIGS. 6, 7, and 8, further details are illustrated by FIGS. 6a and 12. FIG. 6a is a schematic view illustrating typical geometry of an illuminator. The ellipse 250 has focal points 100 and 300, minor diameter 200 and major diameter 201. (In a typical operating embodiment of the invention, the major diameter is approximately four inches and the minor diameter is approximately 3.3 inches). The lamp line light source 37 is located along the line of the locus of focal points 300, and the material being copied is positioned at the other locus of focal points 100. While the elliptical focus point 100 is referred to as a line, it is to be understood that actually it is a line segment with a length in the order of about 12 inches. The elliptic-cylindrical surface segments 102 and 103, which may typically be polished aluminum, form approximately one-half an ellipse. The axis of the ellipse is tilted approximately 10° from vertical, i.e., 10° from being perpendicular to the plane of the document. This provides for the reflected light that is to be sensed to be reflected through slot aperture 93 along line 92 perpendicular to the document being copied. This also places the lamp 37 and its cylindrical reflector 101 out of the path of the reflected propagating light. It also positions the lamp 37 with respect to the slot such that direct illumination from lamp 37 does not enter propagation path 92 of the reflected light. Reflecting baffle 101, positioned along the major elliptic axis, has a cross-section comprising a circular arc with its center coinciding with the center of illumination lamp 37. The inside surface of baffle 101 is reflective, so that light and heat directed toward arcuate right circular cylindrical baffle 101 is redirected backwardly through lamp 37. Thus, it returns those rays that would otherwise not be focussed so that they pass through the lamp to the reflecting surfaces; therefore, substantially all the light from the lamp gets focussed on the document area being copied. The reflector, by returning heat to the lamp, improves the efficiency of the lamp. It also prevents direct radiation from the lamp from striking the document. The reflector thus spans an arc defined by lines 202 and 203, lines through the focal point 300 and the open end of the ellipse at peripheral termination of reflector segments 102 and 103. Reflecting baffle 101, in addition to reflecting light that would otherwise be lost, functions as a heat baffle lowering the requirements on the heat filters 210 and 211. Conventional transparent heat filters 210 and 211 are held in place with clips 212 and 213 attached to end plates 214 and 215, respectively. Lamp 37 may be a conventional line source lamp such as a cylindrical tungsten-halogen lamp. Heat filters 210 and 211, positioned over the open end of the elliptical section, may be conventional hot mirrors transmitting the visible spectrum while reflecting the infrared rays. Devices such as described in by Maddox U.S. Pat. No. 4,095,881 are typical, suitable devices of this nature.

The unique geometry of the disclosed elliptic-cylindrical illuminator with its many interdependent variables may be better appreciated considering the following ideal conditions. The illumination source is positioned at one focal point and the material being copied at the other focal point. For maximum reflected signal efficiency, it is desirable that the reflection be perpendicular to the document and as near the major diameter of the ellipse as practical. The baffle must subtend only a length of arc sufficient to prevent direct radiation to pass outside the ellipse. The tilt of the ellipse should only be that required to remove the illumination source and baffle from the propagating reflected light path. The relationship of the light source to the exit path of the reflected light must be such that direct rays do not enter the reflected light path. Thus, the size of section of ellipse used for the reflector, the arc subtended by the baffle, the radial placement length of the baffle, the magnitude of inclination of the major diameter, and the exit opening for the reflected light are all interrelated. This can readily be seen in FIG. 6a, and it is this unique combination of elements that provides a relatively simple, rugged, and highly efficient illuminator, and while the stated foregoing ideal conditions are desirable, departures from the ideal will be made in practicing the invention without seriously affecting the operation of the device.

While the form of apparatus herein described constitutes the preferred embodiment of the invention, it is to be understood that the invention is not limited to this precise form of apparatus, and that changes may be made therein without departing from the scope of the invention.

What is claimed is:

1. Document scanning apparatus comprising:
   a. reflector means including a reflecting surface defining a section of an elliptic cylinder having an enclosed first focal line and a non-enclosed second focal line; said reflecting surface being provided with an elongated slot which extends parallel to said focal lines and which is positioned such that a plane extending along an optical path from said second focal line to said slot makes an acute angle with another plane extending along the major axis of said elliptic cylinder between said focal lines,
   b. a line source of illumination mounted in said reflector means along said first focal line to illuminate said reflecting surface and produce an intense line of illumination at said second focal line,
   c. document support means for supporting a document along said second focal line so as to be illuminated and reflect rays of image light along said optical path,
   d. an arcuate circular cylindrical baffle positioned along said major axis concentric with said first focal line for preventing illumination of said document by direct rays from said line source of illumination and redirecting said direct rays backwardly through said first focal line and toward said reflecting surface; said baffle being positioned in such a manner as to avoid blocking said optical path, e. lens means for receiving said rays of image light and focussing said rays into an image of said document, f. a plurality of photodetecting elements arranged along a line for sensing said image and producing electrical representations thereof, g. carriage means for supporting said reflector means, said baffle, said lens means, and said photodetecting elements, and h. means for causing relative movement between said carriage means and said document.

2. Document scanning apparatus according to claim 1 and further comprising a heat filter positioned between said reflecting surface and said document.

3. Document scanning apparatus according to claim 2 wherein said acute angle is an angle of approximately 10 degrees.

4. Document scanning apparatus according to claim 3 wherein said reflecting surface defines an elliptic section which is approximately half of a complete ellipse.

5. Document scanning apparatus according to any of claims 1 through 4 and further comprising a folding mirror between said lens means and said slot for bending said rays of image light through an angle of approximately 90 degrees.

6. Apparatus according to claim 5 wherein said folding mirror causes said rays of image light to be bent from a substantially vertical path to a substantially horizontal path.

7. A document scanning apparatus for scanning original documents in relative motion with respect to said apparatus comprising:

a. reflector means including opposed concave elliptical reflectors, said reflectors defining a section of an elliptic cylinder having a first focal line enclosed by said section and a non-enclosed second focal line; said reflectors further defining an elongated slot formed between said reflectors and extending parallel to said focal lines, said slot being positioned such that a plane extending along an optical path from said second focal line to said slot makes an acute angle with another plane extending along the major axis of said elliptic cylinder between said focal lines, b. a line source of illumination mounted in said reflector means along said first focal line to illuminate said reflectors and produce an intense line of illumination at said second focal line, c. document support means for supporting a document along said second focal line so as to be illuminated and reflect rays of image light along said optical path, d. an arcuate circular cylindrical baffle positioned along said major axis concentric with said first focal line for preventing illumination of said document by direct rays from said line source of illumination and redirecting said direct rays backwardly through said first focal line and toward said reflectors; said baffle being positioned in such a manner as to avoid blocking said optical path, and e. means for receiving said rays of image light.

8. A document illuminator comprising:

a first reflector defining a first concave surface portion of a right elliptical cylinder having first and second focal lines, a second reflector defining a second concave surface portion of said right elliptical cylinder, means disposing said first and second reflectors so as to substantially enclose said first focal line, said first reflector having an edge disposed in spaced relationship within edge of second reflector so as to define therebetween an elongated slot which extends parallel to said focal lines and which is positioned such that a plane extending along an optical path from said second focal line to said slot makes an acute angle with another plane extending between said focal lines, a source of illumination mounted along said first focal line, means for supporting a document along said second focal line so as to be illuminated and reflect rays of image light along said optical path, and an arcuate circular cylindrical baffle positioned along the major axis of said first and said second elliptical cylinders concentric with said first focal line for preventing illumination of said document by direct rays from said line source of illumination and redirecting said direct rays backwardly through said first focal line and toward said first and second reflectors, said baffle being positioned in such a manner as to avoid blocking said optical path.

* * * * *